United States Patent
Shimizu

(10) Patent No.: US 9,143,647 B2
(45) Date of Patent: Sep. 22, 2015

(54) IMAGE READING APPARATUS AND METHOD, IMAGE FORMING APPARATUS, AND COMPUTER-READABLE MEDIUM

(71) Applicant: FUJI XEROX Co., Ltd., Minato-ku, Tokyo (JP)

(72) Inventor: Kosuke Shimizu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 22 days.

(21) Appl. No.: 13/750,675

(22) Filed: Jan. 25, 2013

(65) Prior Publication Data
US 2014/0022605 A1    Jan. 23, 2014

(30) Foreign Application Priority Data
Jul. 19, 2012   (JP) ................ 2012-160916

(51) Int. Cl.
  *H04N 1/04*   (2006.01)
  *H04N 1/40*   (2006.01)
  *H04N 1/00*   (2006.01)

(52) U.S. Cl.
  CPC ......... *H04N 1/00896* (2013.01); *H04N 1/0005* (2013.01); *H04N 1/00013* (2013.01); *H04N 1/00037* (2013.01); *H04N 1/00082* (2013.01); *H04N 1/00708* (2013.01); *H04N 1/00551* (2013.01); *H04N 2201/044* (2013.01)

(58) Field of Classification Search
  CPC .......... H04N 1/00013; H04N 1/00037; H04N 1/0005; H04N 1/00082; H04N 1/00551; H04N 1/00708; H04N 1/00896; H04N 2201/044
  USPC .......................................... 358/449
  See application file for complete search history.

(56) References Cited

U.S. PATENT DOCUMENTS

| | | | |
|---|---|---|---|
| 2003/0010903 A1* | 1/2003 | Hsu ........................ | 250/222.1 |
| 2006/0193013 A1* | 8/2006 | Hoshi ...................... | 358/474 |
| 2006/0208157 A1* | 9/2006 | Michiie ................... | 250/208.1 |
| 2007/0201076 A1* | 8/2007 | Ishida ..................... | 358/1.14 |
| 2007/0201918 A1* | 8/2007 | Shoda et al. ............. | 399/376 |

FOREIGN PATENT DOCUMENTS

JP    2004-109639 A    4/2004

* cited by examiner

*Primary Examiner* — Huo Long Chen
*Assistant Examiner* — Moustapha Diaby
(74) *Attorney, Agent, or Firm* — Sughrue Mion, PLLC

(57) ABSTRACT

An image reading apparatus includes a document cover, a cover state detector that detects whether the document cover is open or closed, an image reading unit that reads an image by conducting an optical scan that moves a scanning body with a mounted light source, detecting reflected light from the target object with a photoelectric transducer, and outputting a signal expressing the detected pixel densities, a white reference plate used as a reference for correcting an image, a power manager that switches between a power-saving state and a standby state, and a controller that controls the respective units such that in the case of restoring the standby state due to detecting the opening or closing of the document cover, an image of a document is read to detect the document size, and an image of the white reference plate is read after the detection to acquire correction values.

13 Claims, 15 Drawing Sheets

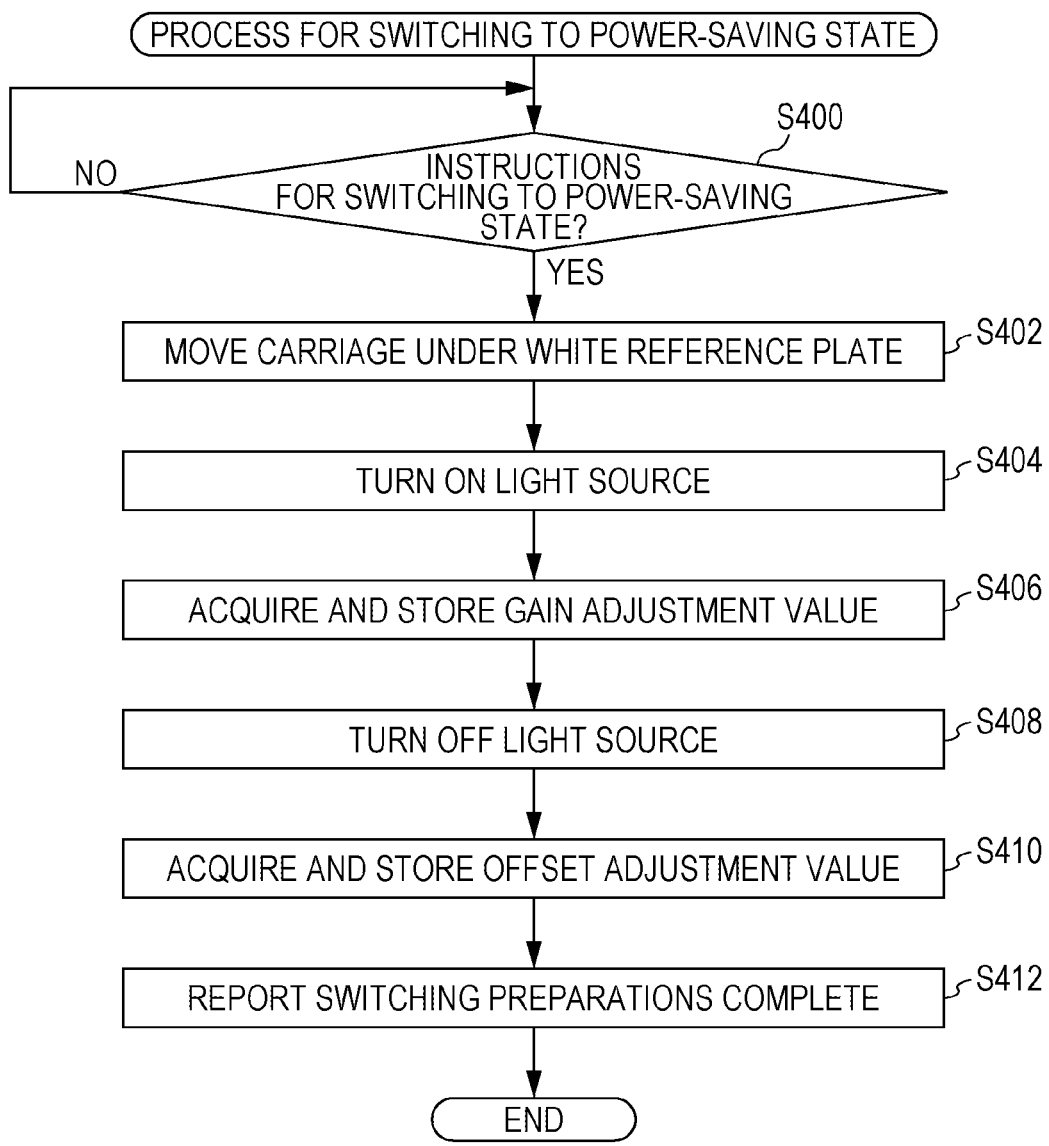

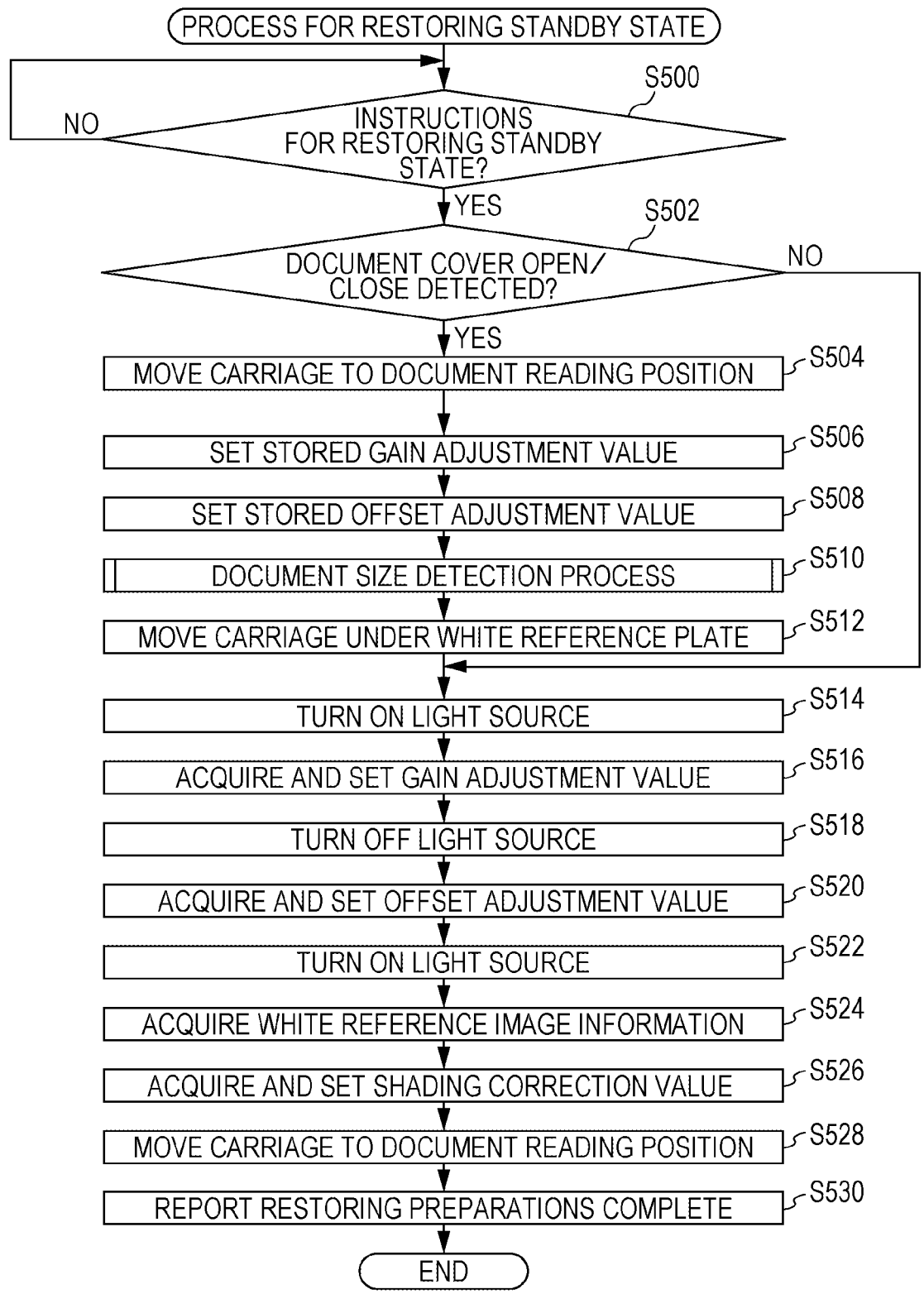

IMAGE READING APPARATUS AND METHOD, IMAGE FORMING APPARATUS, AND COMPUTER-READABLE MEDIUM

CROSS-REFERENCE TO RELATED APPLICATIONS

This application is based on and claims priority under 35 USC 119 from Japanese Patent Application No. 2012-160916 filed Jul. 19, 2012.

BACKGROUND

Technical Field

The present invention relates to an image reading apparatus and method, an image forming apparatus, and a computer-readable medium.

SUMMARY

According to an aspect of the invention, there is provided an image reading apparatus that includes a document cover, a cover state detector that detects whether the document cover is open or closed, an image reading unit that reads an image of a target object by conducting an optical scan that moves a scanning body with a mounted light source, detecting reflected light from the target object with a photoelectric transducer, and outputting a signal expressing the detected pixel densities, a white reference plate used as a reference for correcting an image, a power manager that switches between a power-saving state and a standby state, and a controller that controls the respective units such that in the case of restoring the standby state due to detecting the opening or closing of the document cover, an image of a document is read to detect the document size, and an image of the white reference plate is read after the detection to acquire correction values.

BRIEF DESCRIPTION OF THE DRAWINGS

Exemplary embodiments of the present invention will be described in detail based on the following figures, wherein:

FIG. 11A is a graph illustrating a threshold set with respect to density change at the optical axis center, while

FIG. 12 is a flowchart illustrating the sequence of a process for switching to a power-saving state, which is executed according to a second exemplary embodiment of the present invention;

FIG. 13 is a flowchart illustrating the sequence of a process for restoring the standby state, which is executed according to a second exemplary embodiment of the present invention;

DETAILED DESCRIPTION

Hereinafter, exemplary embodiments of the invention will be described in detail and with reference to the drawings.

First Exemplary Embodiment (Image Forming Apparatus)

First, a configuration of an image forming apparatus will be described.

Figure 1:
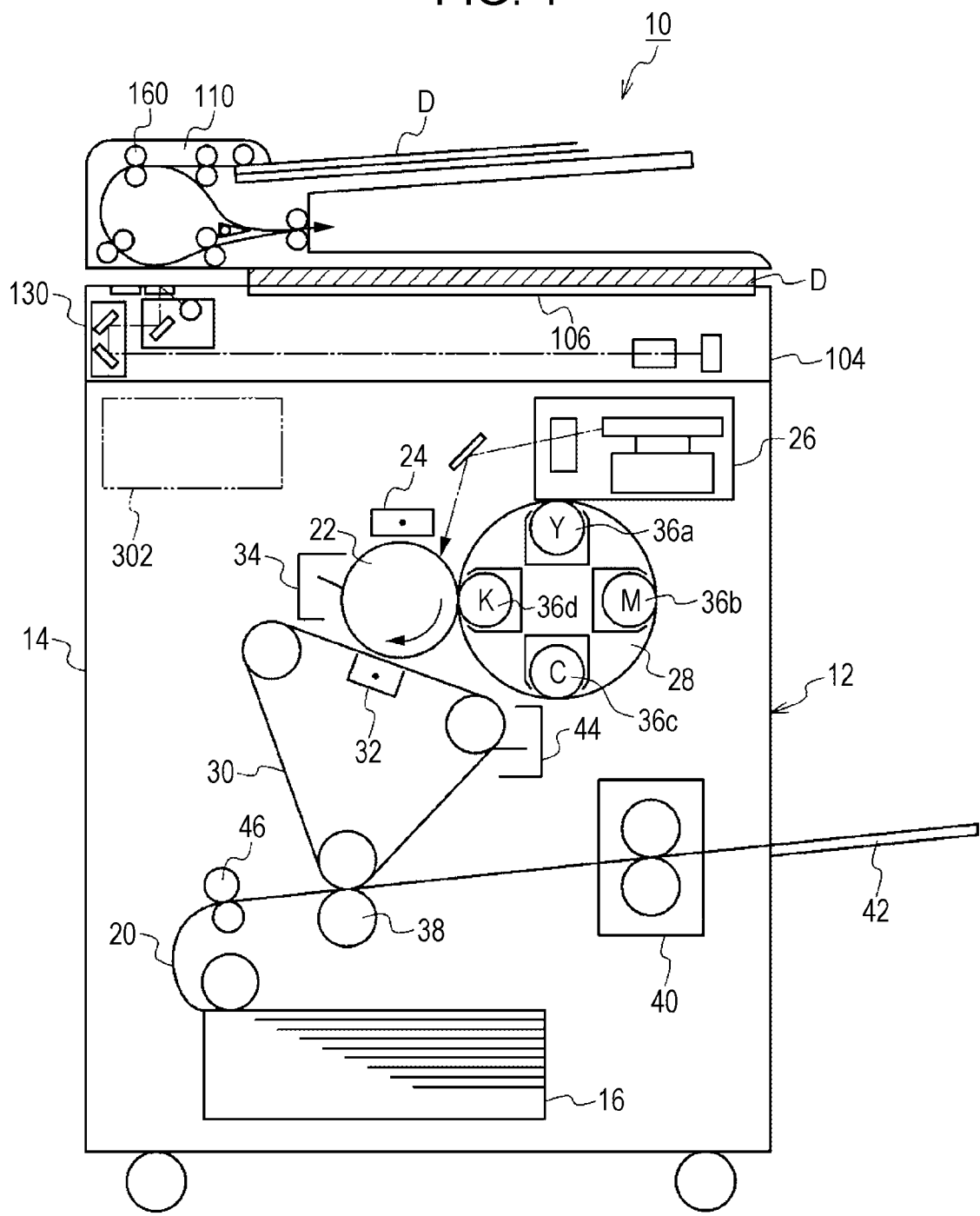
FIG. 1 is a schematic diagram illustrating an exemplary configuration of an image forming apparatus according to an exemplary embodiment of the present invention.

FIG. 1 is a schematic diagram illustrating an exemplary configuration of an image forming apparatus according to an exemplary embodiment of the present invention. As illustrated in FIG. 1, the image forming apparatus 10 includes an image reading apparatus 100 and an image forming unit 12 that forms an image on the basis of image information read by the image reading apparatus 100. The image forming unit 12 includes a sheet storage container 16 where sheets are stored in a stacked state, and forms an image on a sheet supplied to a sheet transport path 20 from the sheet storage container 16. In this exemplary embodiment, the image forming unit 12 forms an image with an electrophotographic system.

The image forming unit 12 includes an image forming unit housing 14. Disposed inside the image forming unit housing 14 are an image retainer 22 such as a photoreceptor drum, for example, a charger 24 that charges the image retainer 22, an exposing device 26 that forms a latent image on the image retainer 22 charged by the charger 24, a developing device 28 that renders the latent image on the image retainer 22 formed by the exposing device 26 visible with toner, an intermediate transfer belt 30 used as an intermediate transfer body, a first transfer device 32 that transfers the toner image formed on the image retainer 22 to the intermediate transfer belt 30, and a photoreceptor cleaner 34 that cleans up toner remaining on the image retainer 22.

Also disposed inside the image forming unit housing 14 are a second transfer device 38 that transfers the toner image that was transferred onto the intermediate transfer belt 30 to a sheet, a fusing device 40 that fuses the toner image transferred to a sheet, and an intermediate transfer belt cleaner 44 that cleans the intermediate transfer belt 30. Disposed on the front of the image forming unit housing 14 is an operation display unit 302 used as a user interface. Disposed on the side of the image forming unit housing 14 is a delivery unit 42 where a sheet with an image formed thereon is delivered.

The exposing device 26 may be a laser scanning exposing device, for example, which converts and outputs image information from a document read with a photoelectric transducer 138 discussed later included in the image reading apparatus 100 (see FIG. 2) as a laser on/off signal. The developing device 28 may be a rotary developing device, for example, which includes developers 36a, 36b, 36c, and 36d for the four colors yellow (Y), magenta (M), cyan (C), and black (K) disposed around a rotary body. The rotary body of the developing device 28 rotates such that the developers for the respective colors successively face the image retainer 22.

The first transfer device 32 may be realized with a corotron, for example. A 4-color toner image is transferred to the intermediate transfer belt 30 by the first transfer device 32. The toner image transferred to the intermediate transfer belt 30 is transferred to a sheet by the second transfer device 38. The sheet bearing the transferred toner image is supplied to the fusing device 40. The toner image is fused to the sheet by the fusing device 40. The sheet bearing the fused toner image is delivered to the delivery unit 42. Toner remaining on the intermediate transfer belt 30 is scraped off by the intermediate transfer belt cleaner 44.

The operation display unit 302 may include various buttons such as a Start button and a keypad, and a touch panel for displaying various screens such as settings screens. With the above configuration, the operation display unit 302 receives user operations while also presenting various information to the user. For example, when forming an image, formation of a monochrome image or a multi-color image may be selected, and settings such as the image magnification and quality may be set. Also, when reading an image, black and white reading or color reading may be selected, and settings such as the document read area, the document scanning speed (factor), the document transport method, and the document size may be set.

Disposed along the sheet transport path 20 is a registration roller 46. The registration roller 46 is controlled so as to temporarily stop a supplied sheet and supply the sheet to the second transfer device 38 in synchronicity with the timing at which a toner image is formed on the intermediate transfer belt 30.

The image reading apparatus 100 includes a platen 104 on which a document D is placed, and a document cover 110 provided in an openable and closable manner with respect to the platen 104. The platen 104 includes a transparent member 106 realized with a light-transmitting material such as glass, for example.

The platen 104 is formed as a housing. Disposed inside the platen 104 is a reading unit 130 that radiates light onto a document placed on the transparent member 106, and reads in an image of a document on the basis of reflected light from the document. A document transport device 160 that automatically transports the document D is also installed inside the document cover 110. The image reading apparatus 100 is equipped with functionality for reading in an image of a document D being transported by the document transport device 160, as well as functionality for reading in an image of a document D placed on top of the transparent member 106.

In addition, in this exemplary embodiment, the image forming apparatus 10 is equipped with power-saving functionality that reduces power consumption in the image forming apparatus. Specifically, the image forming apparatus 10 includes a power manager 300 (see FIG. 6) that manages the power supply states for respective units, including the reading unit 130. As discussed later, the power manager 300 switches between a "power-saving state" in which power is supplied to part of the apparatus, and a "standby state" in which power is supplied to the entire apparatus.

(Image Reading Apparatus)

Next, a configuration of an image reading apparatus will be described.

Figure 2:
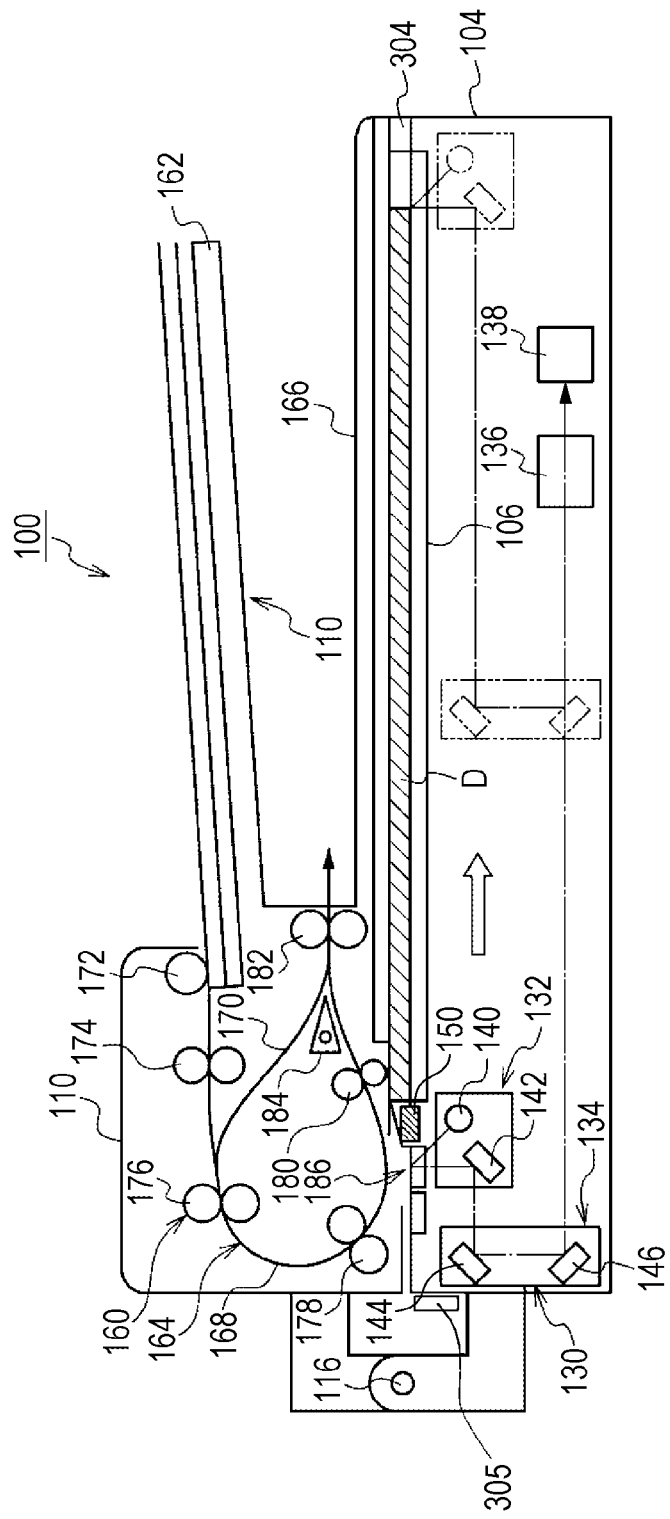
FIG. 2 is a schematic diagram illustrating an exemplary configuration of an image reading apparatus according to an exemplary embodiment of the present invention.
Figure 3:
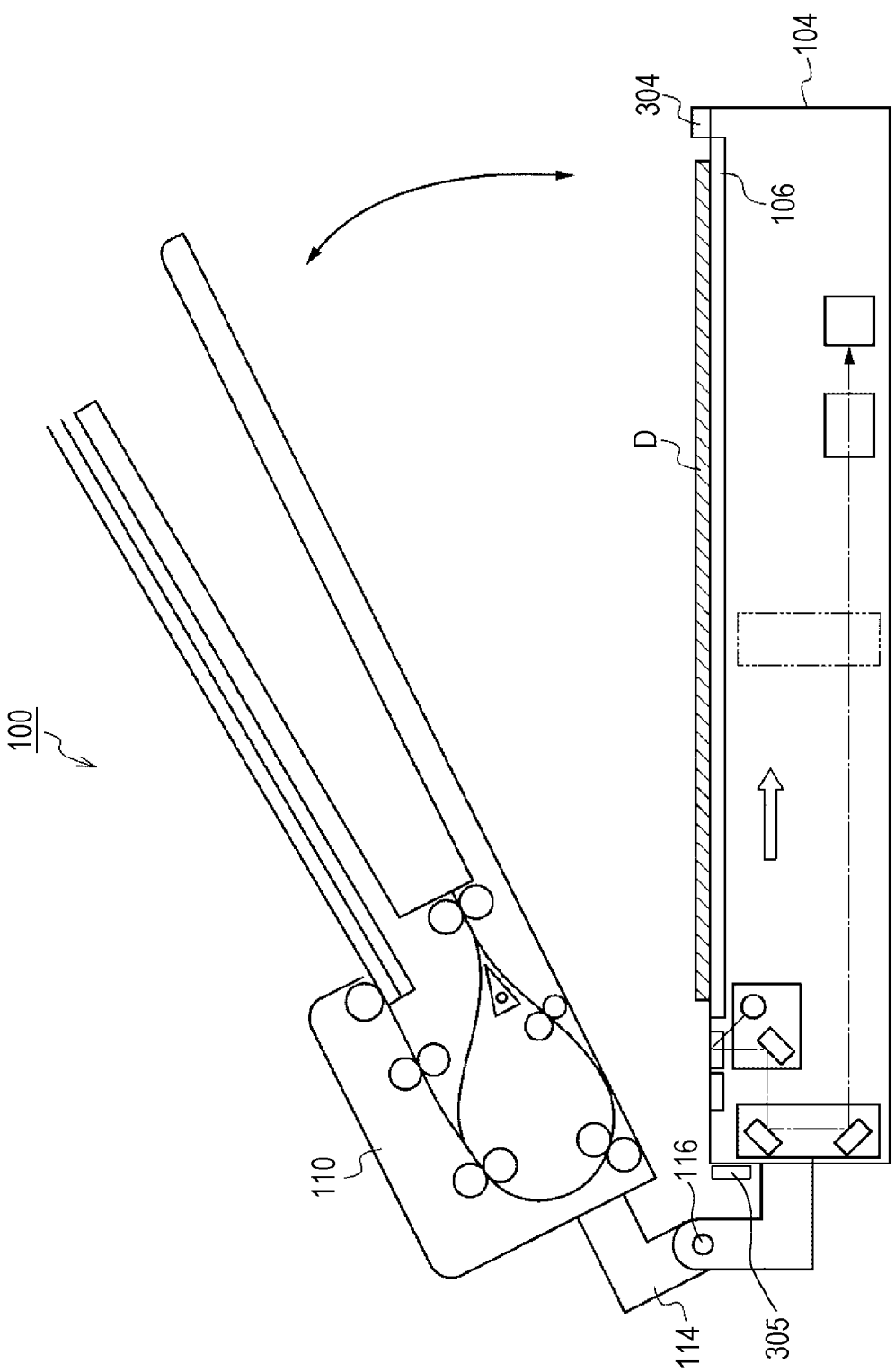
FIG. 3 is a schematic diagram illustrating a state in which the document cover of the image reading apparatus illustrated in FIG. 2 is open.

FIG. 2 is a schematic diagram illustrating an exemplary configuration of an image reading apparatus according to an exemplary embodiment of the present invention. FIG. 3 is a schematic diagram illustrating a state in which the document cover of the image reading apparatus illustrated in FIG. 2 is open. As illustrated in FIGS. 2 and 3, the image reading apparatus 100 includes a hinge 114 equipped with an axle 116. The platen 104 and the document cover 110 are linked by the hinge 114. The document cover 110 opens and closes with respect to the platen 104 by rotating about the axle 116. In the state where the document cover 110 is closed, the transparent member 106 becomes covered, as illustrated in FIG. 2.

In addition, a cover state detector 304 that detects whether the document cover 110 is open or closed and an angle detector 305 that detects the angle at which the document cover 110 is open or closed are attached to the image reading apparatus 100. With the cover state detector 304 and the angle detector 305, at least three states are detected: a state in which the document cover member is wide open (open state), a state in which the document cover is nearly closed (nearly closed state), and a state in which the document cover is fully closed (closed state).

The document transport device 160 transports a document from a document receptacle 162 where a document is placed before reading, and includes a document transport path 164 and a delivery receptacle 166 where a document is delivered after an image is read. The document transport path 164 includes a simplex section 168 and a duplex section 170. The simplex section 168 is U-shaped. A pickup roller 172, a feed roller 174, a registration pre-roller 176, a registration roller 178, a feed roller 180, and a delivery roller 182 which constitute a transport device are disposed in order along the simplex section 168 starting from the upstream side in the document transport direction.

The pickup roller 172 descends when feeding a document, and picks up a document placed in the document receptacle 162. The feed roller 174 loosens the document supplied from the pickup roller 172, and supplies the uppermost document to the registration pre-roller 176. The registration pre-roller 176 is configured to perform skew correction by temporarily stopping the document supplied from the feed roller 174 to form a loop. The registration roller 178 temporarily stops the document sent from the registration pre-roller 176 and adjusts the read timings. When delivering a document, the delivery roller 182 is rotated forward and the document is delivered into the delivery receptacle 166 via the feed roller 180 and the delivery roller 182.

One end of the duplex section 170 is connected to the simplex section 168 between the feed roller 180 and the delivery roller 182, while the other end is connected to the simplex section 168 upstream to the registration pre-roller 176. A reversal gate 184 is provided at the one end of the duplex section 170. When reversing a document, the delivery roller 182 is rotated backward at the stage where the trailing edge of the document reaches the delivery roller 182, and the document is guided into the duplex section 170 by positioning the reversal gate 184 downward. The reversal gate 184 may also be configured to open due to the pressing force of a document, and close due its own weight. A driving unit that opens and closes the reversal gate 184 may also be provided.

Also, a transported document reading position 186, being the position where a document is read when a document is previewed during transport, is provided along the simplex section 168. The transported document reading position 186 is provided between the registration roller 178 and the feed roller 180, and is configured to acquire an image of a document supplied by the document transport device 160.

The reading unit 130 includes a full-rate carriage 132 as a first scanner, and a half-rate carriage 134, lens 136, and photoelectric transducer 138 as a second scanner. The full-rate carriage 132 includes a light source 140 and a first mirror 142. As indicated by the arrow in FIG. 2, the full-rate carriage 132 is configured to perform a full stroke movement inside the platen 104 in the sub-scan direction, taking the document scan direction (sub-scan direction) as the movement direction.

The light source 140 is a lamp or other component extending in a first direction (the scan direction) intersecting the document transport direction. The light source 140 has a preset scan width in the scan direction. The half-rate carriage 134 includes a second mirror 144 and a third mirror 146. The half-rate carriage 134 is configured to perform a half-stroke movement inside the platen 104 in the sub-scan direction.

As described above, the half-rate carriage 134 moves in the wake of the full-rate carriage 132. Hereinafter, the full-rate carriage 132 and the half-rate carriage 134 will be designated the carriage 132 (134). The reading unit 130 is equipped with a carriage detector 306 that detects the carriage position. Note that the carriage position herein refers to the position of the full-rate carriage 132 equipped with the light source 140.

The light source 140 radiates light onto a document placed on the transparent member 106 provided above the movement range of the full-rate carriage 132 and the half-rate carriage 134, or onto a document that passes the transported document reading position 186. The lens 136 receives reflected light reflected off the document via the first mirror 142, the second mirror 144, and the third mirror 146, and forms an image on the photoelectric transducer 138.

The photoelectric transducer 138 detects reflected light at the imaging forming position of the reflected light from the lens 136, and outputs an analog electrical signal corresponding to the detected light intensity to a processor circuit discussed later. The photoelectric transducer 138 may be, for example, a 3-line color CCD that outputs an analog electrical signal corresponding to the detected light intensity for each of the RGB colors in units of pixels from a photodiode provided with an RGB color filter (primary color filter).

A first white reference plate 150 that reflects light radiated by the light source 140 is provided between the transported document reading position 186 and the transparent member 106. In the first white reference plate 150, the reflective surface that reflects light has a white color given as a reference, and is configured such that when the image forming apparatus 10 is powered on, for example, the light source 140 irradiates the first white reference plate 150 with light, and the reflected light therefrom (the default reference light intensity) is detected by the photoelectric transducer 138 via the first mirror 142, the second mirror 144, the third mirror 146, and the lens 136.

Figure 4:
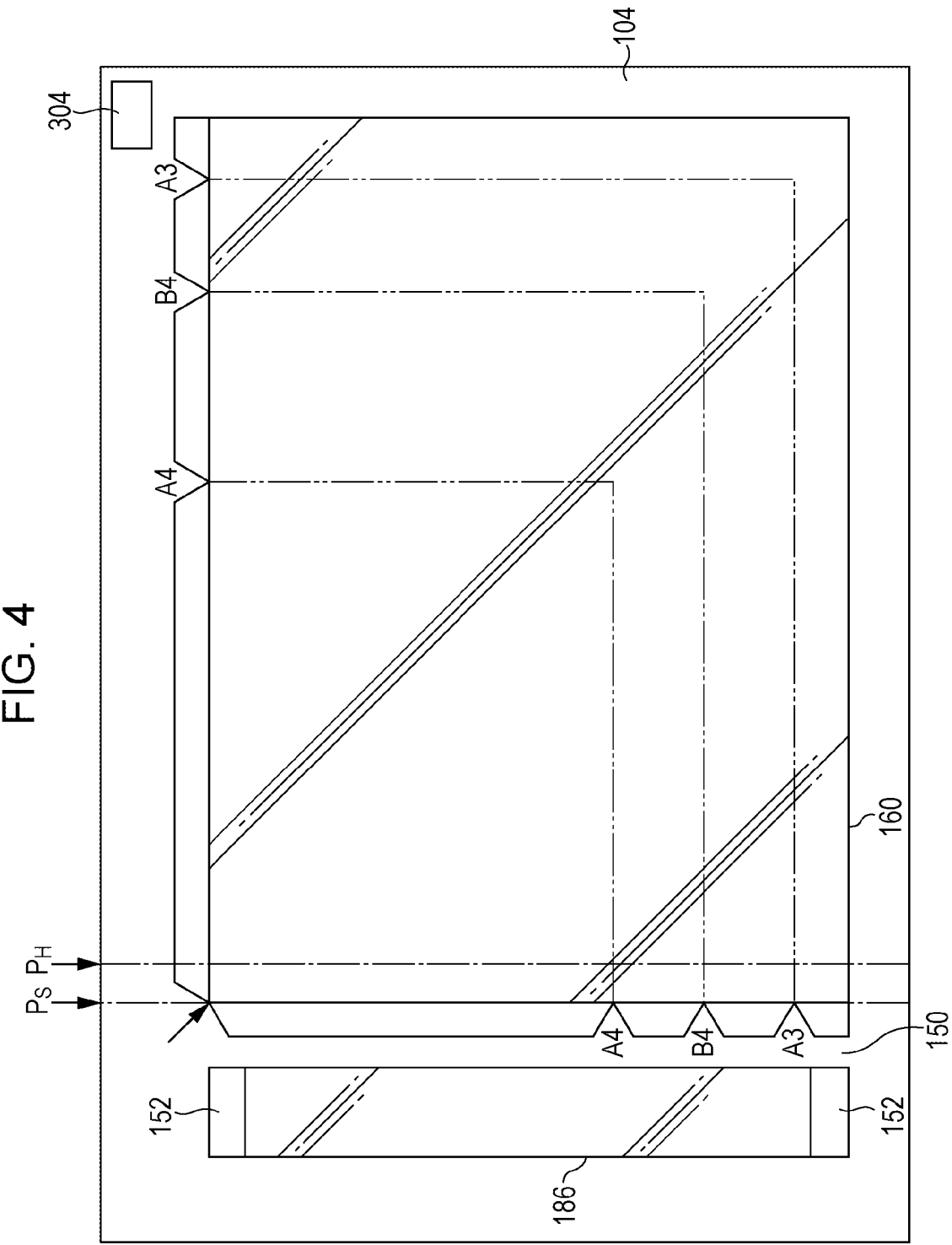
FIG. 4 is a plan view illustrating the platen of the image reading apparatus illustrated in FIG. 2.

FIG. 4 is a plan view illustrating the platen of the image reading apparatus illustrated in FIG. 2. FIG. 4 illustrates the platen 104 in a state where the document cover 110 is open. As illustrated in FIG. 4, second white reference plates 152 that reflect light radiated by the light source 140 are respectively provided at the ends of the transported document reading position 186. In the second white reference plates 152, the reflective surface that reflects light has a white color given as a reference, and is configured such that when the image reading apparatus 100 previews an image of a document, for example, the light source 140 irradiates the second white reference plates 152 with light, and the reflected light therefrom (the scanning reference light intensity) is detected by the photoelectric transducer 138 via the first mirror 142, the second mirror 144, the third mirror 146, and the lens 136.

The above cover state detector 304 is disposed on the upward-facing surface of the platen 104. The cover state detector 304 is disposed outside the transparent member 106. Also, guides are provided on the upward-facing surface of the platen 104, which are used for document positioning in the case where the user places a document on top of the transparent member 106. For example, guides used for document positioning according to the document type and size, such as A4, B4, and A3, may be indicated by a method such as printing, for example. Note that the double-dot chain lines in FIG. 4 indicate the document positions for the cases where an A4 document, a B5 document, and an A3 document are placed on the transparent member 106, respectively.

In the case of reading an image of a document placed on top of the transparent member 106 in an image reading apparatus 100 configured as above, the light source 140 radiates light towards the document while the full-rate carriage 132 and the half-rate carriage 134 respectively move in the sub-scan direction. In so doing, the photoelectric transducer 138 successively detects reflected light corresponding to the entire surface of the document. Also, in the case where the image reading apparatus 100 previews an image of a document, the photoelectric transducer 138 detects reflected light from a transported document for each sheet at the transported document reading position 186.

Also, when the carriage moves from under the first white reference plate 150 to a document reading position $P_H$, the above carriage detector 306 (see FIG. 6) detects that the carriage has passed a reading start position $P_S$. For example, the detection signal of the carriage detector 306 switches from an off state to an on state at the point when the read line position of the reading unit 130 passes the reading start position $P_S$ and advances to a read area where the transparent member 106 is disposed. Conversely, the detection signal of the carriage detector 306 switches from an on state to an off state at the point when the read line position of the reading unit 130 passes the reading start position $P_S$ and advances to a position under the first white reference plate 150. As described above, the position of the carriage is recognized from the detection signal of the carriage detector 306.

(Control Subsystem of Image Forming Apparatus)

Next, a configuration of a control subsystem of an image forming apparatus will be described.

Figure 5:
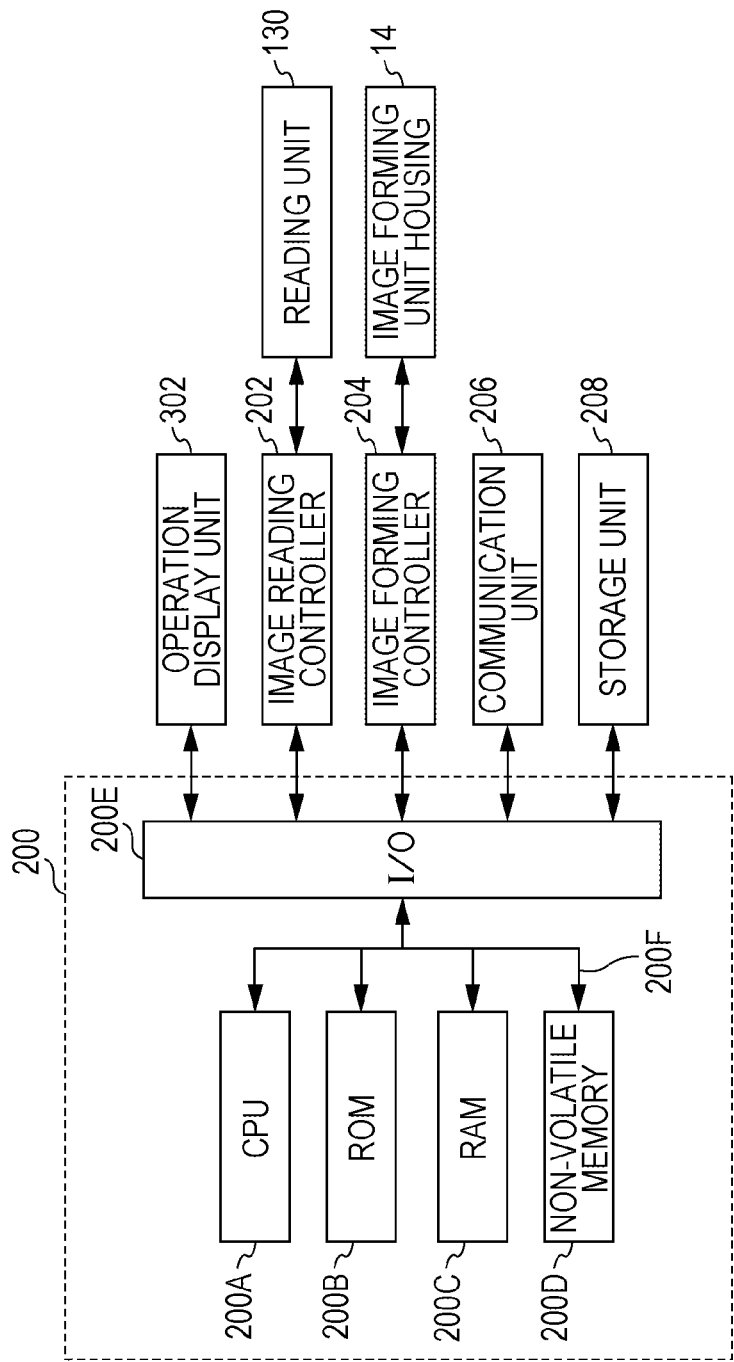
FIG. 5 is a block diagram illustrating an exemplary configuration of the control subsystem of an image forming apparatus according to an exemplary embodiment of the present invention.

FIG. 5 is a block diagram illustrating an exemplary configuration of the control subsystem of an image forming apparatus according to an exemplary embodiment of the present invention. As illustrated in FIG. 5, the image forming apparatus 10 according to the present exemplary embodiment is equipped with a controller 200, an image reading controller 202 that controls the action of the above operation display unit 302 and the reading unit 130, an image forming controller 204 that controls the action of the above image forming unit 12, a communication unit 206 which is an interface for communicating with external apparatus via a wired or wireless communication link, and a storage unit 208 which is a storage apparatus such as a hard disk. The storage unit 208 stores information such as various data and control programs.

The controller 200 is realized as a computer that controls the apparatus overall and performs various computations. In other words, the controller 200 is equipped with a central processing unit (CPU) 200A, read-only memory (ROM) 200B that stores various programs, random access memory (RAM) 200C used as a work area during program execution, non-volatile memory 200D that stores various information, and an input output interface (I/O) 200E. The CPU 200A, the ROM 200B, the RAM 200C, the non-volatile memory 200D, and the I/O 200E are connected to each other via a bus 200F.

The operation display unit 302, the image reading controller 202, the image forming controller 204, the communication unit 206, and the storage unit 208 are respectively connected to the I/O 200E of the controller 200. The controller 200 respectively controls the operation display unit 302, the image reading controller 202, the image forming controller 204, the communication unit 206, and the storage unit 208.

Note that various drives may also be connected to the controller 200. The various drives may include apparatus that read data from and write data to a computer-readable, portable recording medium, such as a flexible disk, a magneto-optical disc, a CD-ROM, or USB memory. In the case of providing various drives, control programs may be prerecorded onto a portable recording medium, read out with a corresponding drive, and executed.

(Image Reading Controller)

A detailed configuration of the image reading controller 202 will now be described.

Figure 6:
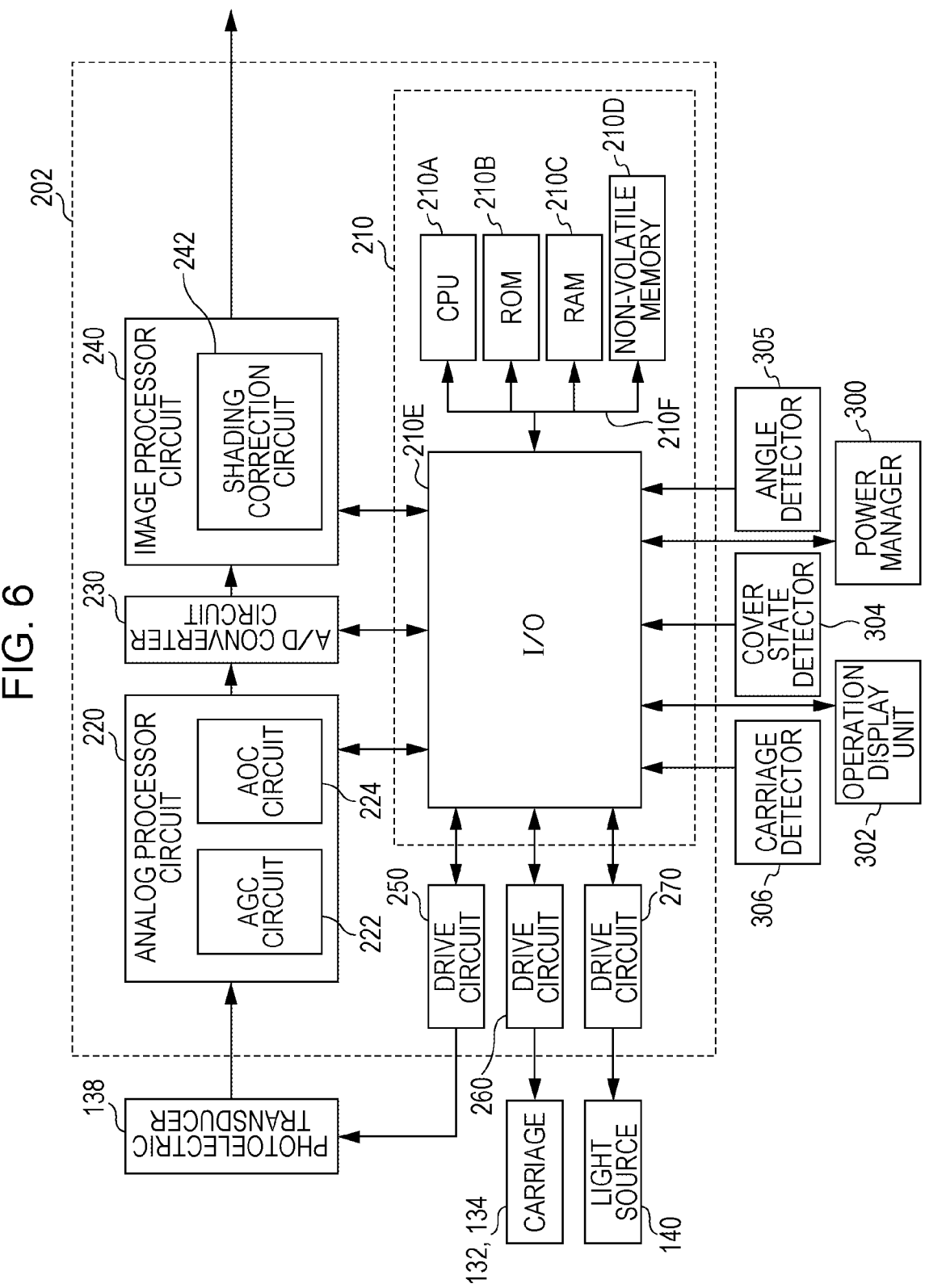
FIG. 6 is a block diagram illustrating an exemplary configuration of the image reading controller illustrated in FIG. 5.

FIG. 6 is a block diagram illustrating an exemplary configuration of the image reading controller illustrated in FIG. 5. As illustrated in FIG. 6, the image reading controller 202 is equipped with a controller 210, an analog processor circuit 220, an A/D converter circuit 230, an image processor circuit 240, a drive circuit 250 that drives the above photoelectric transducer 138, a drive circuit 260 that drives the carriage 132 (134), and a drive circuit 270 that drives the light source 140.

The controller 210 is equipped with a central processing unit (CPU) 210A, read-only memory (ROM) 210B that stores various programs, random access memory (RAM) 210C used as a work area during program execution, non-volatile memory 210D that stores various information, and an input output interface (I/O) 210E. The CPU 210A, the ROM 210B, the RAM 210C, the non-volatile memory 210D, and the I/O 210E are connected to each other via a bus 210F.

In this exemplary embodiment, control programs including a process for switching to a power-saving state and a process for restoring to a standby state, to be discussed later, are stored in the ROM 210B of the controller 210. These control programs are read out and executed by the CPU 210A of the controller 210.

The analog processor circuit 220 is a circuit that conducts various processing on an analog signal expressing image information supplied from the photoelectric transducer 138. In this exemplary embodiment, the analog processor circuit 220 is configured to include a automatic gain control (AGC) circuit 222 and an automatic offset control (AOC) circuit 224.

The AGC circuit 222 acquires a gain adjustment value for adjusting the output level of the photoelectric transducer 138 on the basis of the output from the photoelectric transducer 138 when reading an image of a white reference plate, and sets the acquired gain adjustment value in a register or other component of the AGC circuit 222. Automatic gain control is then applied on the basis of the set gain adjustment value to an analog signal expressing image information when reading an image of a document. In this exemplary embodiment, the set gain adjustment value is stored in the non-volatile memory 210D of the controller 210, and used as a set value during the next and subsequent automatic gain control.

Also, the AOC circuit 224 acquires an offset adjustment value for adjusting fluctuations in the dark output of the photoelectric transducer 138 on the basis of the output from the photoelectric transducer 138 when reading an image of a white reference plate, and sets the acquired offset adjustment value in a register or other component of the AOC circuit 224. Automatic offset control is then applied on the basis of the set offset adjustment value to an analog signal expressing image information when reading an image of a document. In this exemplary embodiment, the set offset adjustment value is stored in the non-volatile memory 210D of the controller 210, and used as a set value during the next and subsequent automatic offset control.

The A/D converter circuit 230 is a circuit that converts a processed analog signal supplied from the analog processor circuit 220 into a digital signal, and supplies digital image information to the image processor circuit 240.

The image processor circuit 240 is a circuit that conducts various image processing on image information supplied from the A/D converter circuit 230. In this exemplary embodiment, the image processor circuit 240 is configured to include a shading correction circuit 242.

The shading correction circuit 242 computes one line's worth of shading correction values used to correct fluctuations in the pixel sensitivity and fluctuations in the intensity distribution of the photoelectric transducer 138, on the basis of white reference image information acquired by reading an image of a white reference plate. The shading correction circuit 242 stores the computed shading correction values in the non-volatile memory 210D of the controller 210. Shading correction is then applied on the basis of the stored shading correction values to digital image information when reading an image of a document.

Herein, "white reference image information" refers to digital image information obtained by conducting automatic gain control and automatic offset control to an analog signal expressing image information when reading an image of a white reference plate, and converting the processed analog signal into a digital signal.

The analog processor circuit 220, the A/D converter circuit 230, the image processor circuit 240, the drive circuit 250, the drive circuit 260, and the drive circuit 270 are respectively connected to the I/O 210E of the controller 210. The controller 210 respectively controls the analog processor circuit 220, the A/D converter circuit 230, the image processor circuit 240, the drive circuit 250, the drive circuit 260, and the drive circuit 270. In addition, the above power manager 300, operation display unit 302, cover state detector 304, angle detector 305, and carriage detector 306 are also respectively connected to the I/O 210E of the controller 210. The controller 210 respectively exchanges information with the power manager 300, the operation display unit 302, the cover state detector 304, the angle detector 305, and the carriage detector 306 via the I/O 210E.

(Power-Saving Function)

A power-saving function of an image forming apparatus according to the exemplary embodiment will now be described.

The reading unit 130 of an image forming apparatus 10 provided with a power-saving function enters a standby state enabling document image reading once boot-up operations finish after the apparatus is powered on. While in the standby state, if the apparatus continues to be unused for a preset amount of time, instructions for switching to the power-saving state are issued, and the apparatus switches to a power-saving state. Whereas the entire image forming apparatus 10 including the reading unit 130 is powered on in the standby state, power is supplied to only part of the image forming apparatus 10 in the power-saving state. For example, power may be supplied to the operation display unit 302 only. By suspending power supply to predetermined areas of the image forming apparatus 10, power consumption is reduced.

If the document cover 110 is opened or closed after switching to the power-saving state, the opening or closing of the document cover 110 is detected by the cover state detector 304, and instructions for restoring the standby state are issued. Also, if a document is placed in the document receptacle 162 of the document transport device 160 after switching to the power-saving state, the document is detected by a document detector (not illustrated), and instructions for restoring the standby state are issued. Also, if a power-saving cancel button (not illustrated) is pressed after switching to the power-saving state, instructions for restoring the standby state are issued. However, these factors for restoring the standby state are given as examples, and instructions for restoring the standby state may also be issued due to other factors. For example, instructions for restoring the standby state may also be issued in the case of receiving an external signal.

If instructions for switching to the power-saving state are issued from the controller 200 of the image forming apparatus 10, the image reading controller 202 which controls operation of the reading unit 130 executes a predetermined switching process, and switches to the power-saving state. Also, if instructions for restoring the standby state are issued from the controller 200 of the image forming apparatus 10, the image reading controller 202 executes a predetermined restoring process, and restores the standby state. Hereinafter, the process for switching to the power-saving state and the process for restoring the standby state will be described in detail.

(Switching to the Power-Saving State)

Next, operation for switching to the power-saving state will be described.

Figure 7:
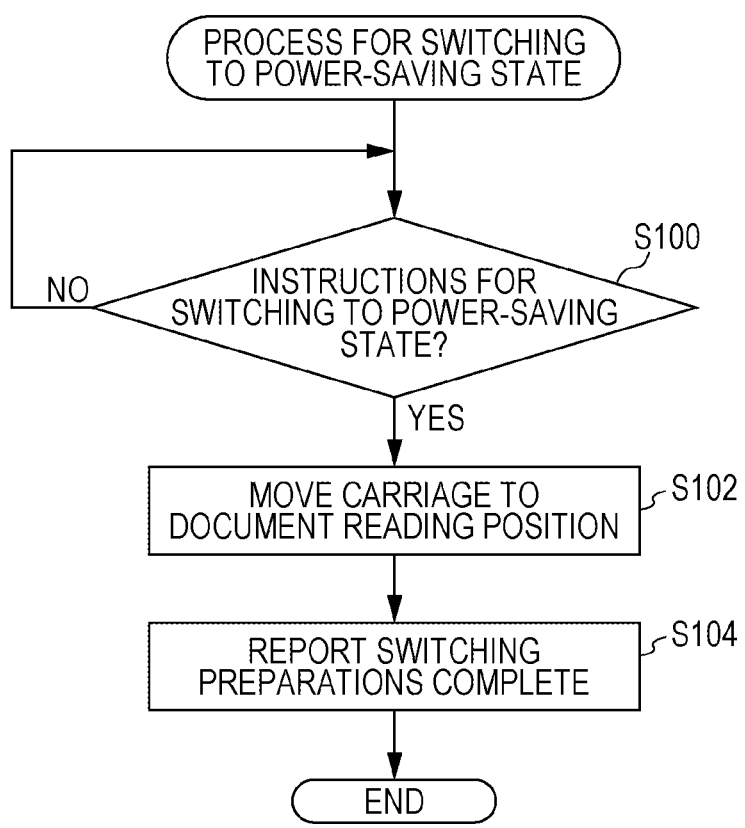
FIG. 7 is a flowchart illustrating the sequence of a process for switching to a power-saving state, which is executed according to a first exemplary embodiment of the present invention.

FIG. 7 is a flowchart illustrating the sequence of a process for switching to a power-saving state, which is executed according to a first exemplary embodiment of the present invention. The process for switching to the power-saving state is executed by the CPU 210A of the controller 210. The process for switching to the power-saving state is initiated after having entered the standby state.

First, in step 100, it is determined whether or not the controller 200 of the image forming apparatus 10 has issued instructions for switching to the power-saving state. The process proceeds to step 102 in the case where instructions for switching to the power-saving state have been issued. The determination in step 100 is repeated until instructions for switching to the power-saving state are issued. Next, in step 102, the drive circuit 260 is controlled to move the carriage to the document reading position $P_H$. Next, in step 104, a notification indicating that switching preparations are complete is issued to the controller 200 of the image forming apparatus 10, and the routine ends.

(Restoring the Standby State)

Next, operation for restoring the standby state will be described.

Figure 8:
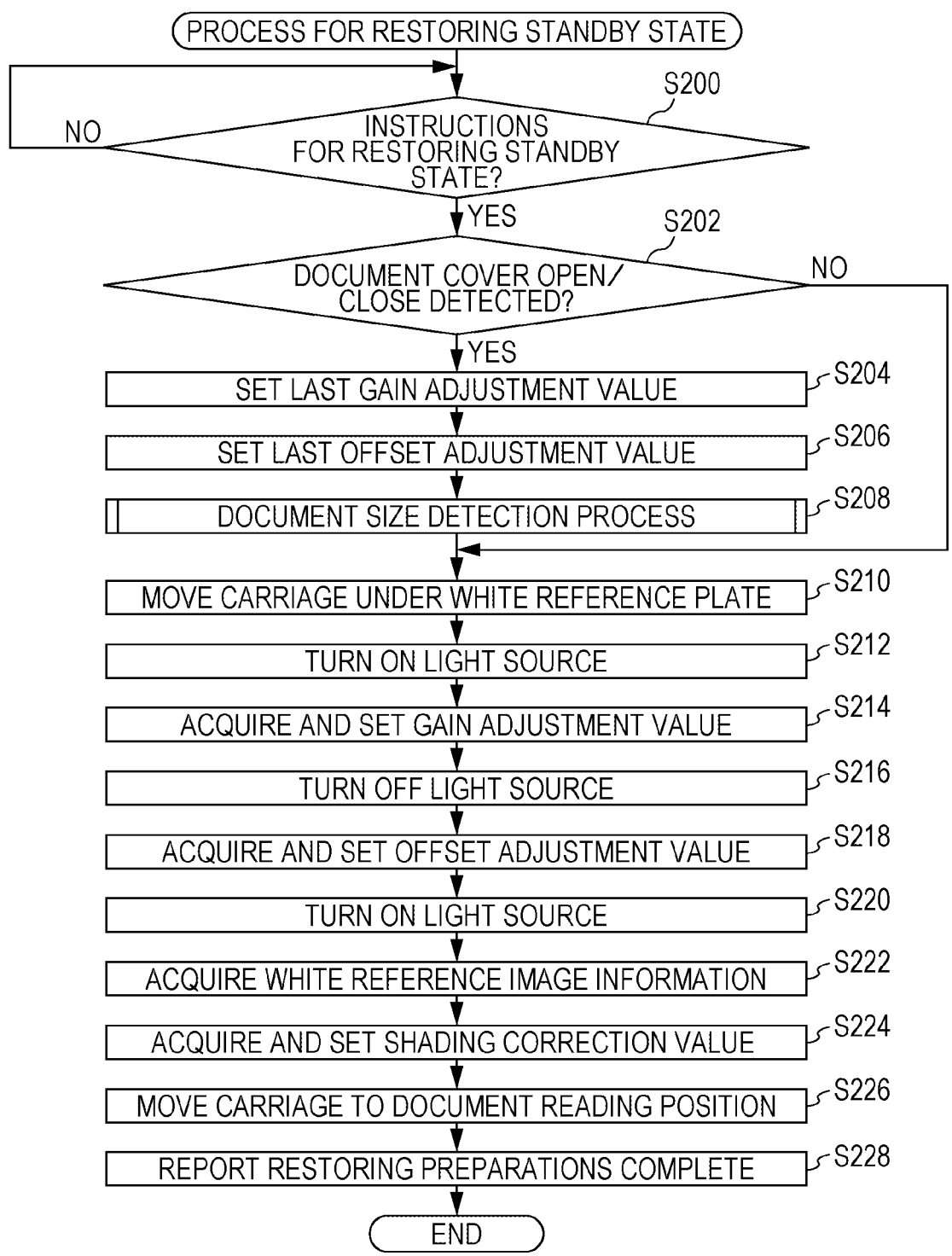
FIG. 8 is a flowchart illustrating the sequence of a process for restoring the standby state, which is executed according to a first exemplary embodiment of the present invention.

FIG. 8 is a flowchart illustrating the sequence of a process for restoring the standby state, which is executed according to a first exemplary embodiment of the present invention. The process for restoring the standby state is executed by the CPU 210A of the controller 210. The process for restoring the standby state is initiated after having entered the power-saving state.

First, in step 200, it is determined whether or not the controller 200 of the image forming apparatus 10 has issued instructions for restoring the standby state. The process proceeds to step 202 in the case where instructions for restoring the standby state have been issued. The determination in step 200 is repeated until instructions for restoring the standby state are issued. Next, in step 202, it is determined whether or not a detection signal has been acquired from the cover state detector 304 which detects the opening and closing of the document cover 110.

The process proceeds to step 204 in the case where a detection signal from the cover state detector 304 has been acquired. The process proceeds to step 210 in the case where a detection signal from the cover state detector 304 has not been acquired. In other words, the case of not acquiring a detection signal from the cover state detector 304 means that restoration is due to some factor other than a detected opening or closing of the document cover 110, and thus document size detection may be omitted. Consequently, the process proceeds to step 210 without carrying out the sequence from step 204 to step 208.

In step 204, the last gain adjustment value is set in the AGC circuit 222, and in the following step 206, the last offset adjustment value is set in the AOC circuit 224. Next, in step 208, a document size detection process that detects the size of the document is executed. The document size detection process will be discussed later. Once the document size detection process ends, the process proceeds to the following step 210.

Next, in step 210, the drive circuit 260 is controlled to move the carriage under the white reference plate. Next, in step 212, the drive circuit 270 is controlled to turn on the light source. Next, in step 214, an image of the white reference plate is read, and a gain adjustment value is acquired and set in the AGC circuit 222. Next, in step 216, the drive circuit 270 is controlled to turn off the light source. Next, in step 218, an image of the white reference plate is read, and an offset adjustment value is acquired and set in the AOC circuit 224.

Next, in step 220, the drive circuit 270 is controlled to turn on the light source. Next, in step 222, white reference image information is acquired. Next, in step 224, a shading correction value is acquired on the basis of the white reference image information. Next, in step 226, the carriage is moved to the document reading position $P_H$. Next, in step 228, a notification indicating that restoring preparations are complete is issued to the controller 200 of the image forming apparatus 10, and the routine ends.

(Document Size Detection Process)

Figure 9:
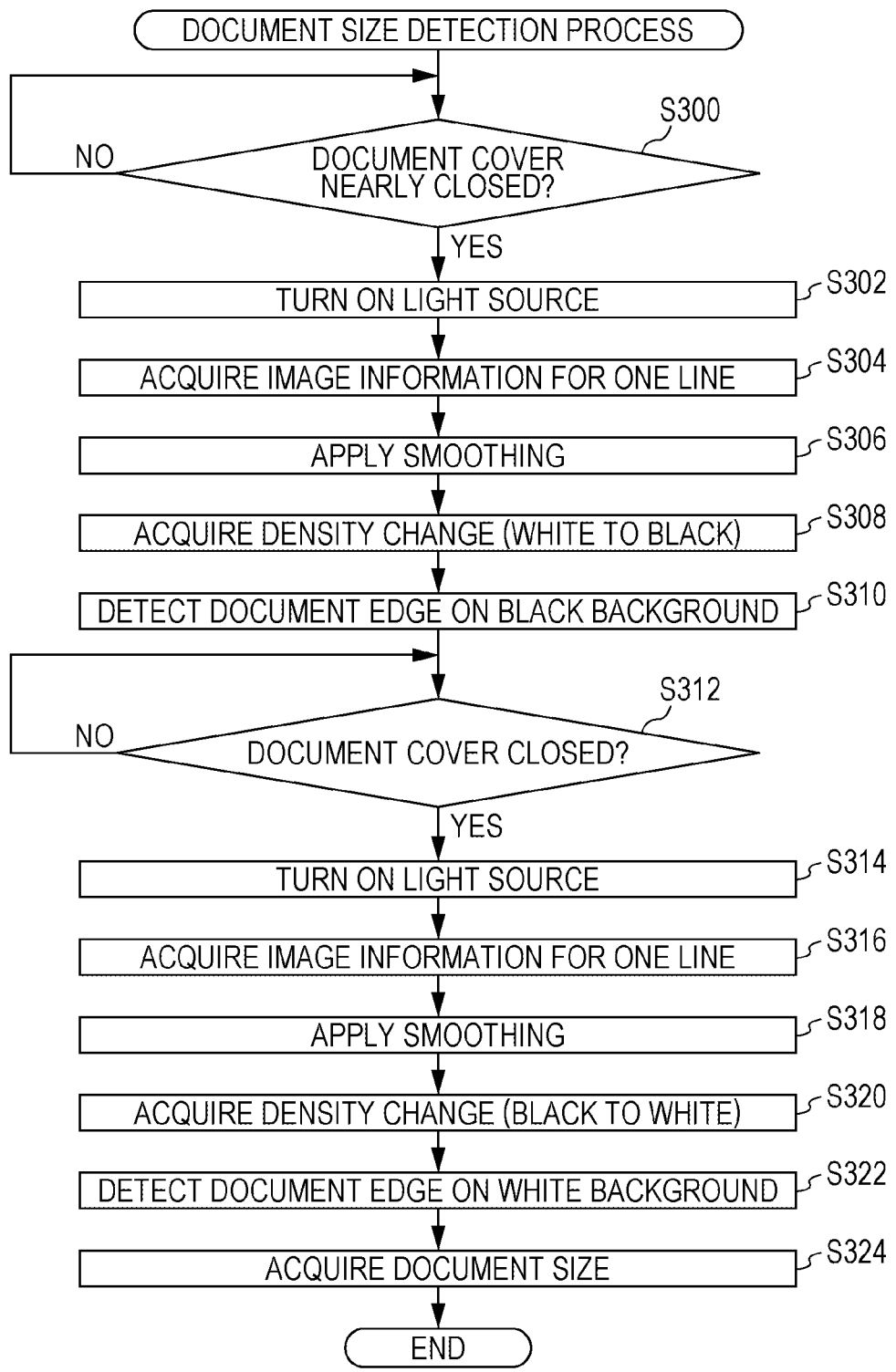
FIG. 9 is a flowchart illustrating the sequence of a document size detection process, which is executed according to a first exemplary embodiment of the present invention.

Next, the document size detection process will be described. FIG. 9 is a flowchart illustrating the sequence of a document size detection process, which is executed according to a first exemplary embodiment of the present invention. First, in step 300, it is determined whether or not the document cover is in the nearly closed state, on the basis of detection signals from the cover state detector 304 and the angle detector 305. The process proceeds to step 302 in the case where the document cover is in the nearly closed state. The determination in step 300 is repeated until the document cover enters the nearly closed state. Next, in step 302, the drive circuit 270 is controlled to temporarily turn on the light source. Next, in step 304, an image of a document is read and one line's worth of image information in the scan direction is acquired.

Next, in step 306, a smoothing process is applied to the one line's worth of image information in the scan direction. Next, in step 308, the smoothed image information is used to acquire the density change in the scan direction. Next, in step 310, the document edge is detected on a black background. Since the background becomes black and the document becomes white when the document cover is in the nearly closed state, the position of the document edge becomes the position in the scan direction where the density change from white to black is equal to or greater than a predetermined threshold value. The position of the document edge acquired on a black background is saved to the RAM 210C.

Note that in this exemplary embodiment, the above density change is acquired by the following method. First, an average density value A is computed for a pixel group with a predetermined number of pixels including a first target pixel. Next, an average density value B is computed for a pixel group with a predetermined number of pixels including a second target pixel separated from the first target pixel by a predetermined distance. The absolute value of the difference between the average density value A and the average density value B is then acquired as the density change.

Next, in step 312, it is determined whether or not the document cover is in the closed state, on the basis of a detection signal from the cover state detector 304. The process proceeds to step 314 in the case where the document cover is in the closed state. The determination in step 312 is repeated until the document cover enters the closed state. Next, in step 314, the drive circuit 270 is controlled to temporarily turn on the light source. Next, in step 316, an image of a document is read and one line's worth of image information in the scan direction is acquired.

Next, in step 318, a smoothing process is applied to the one line's worth of image information in the scan direction. Next, in step 320, the smoothed image information is used to acquire the density change in the scan direction. Next, in step 322, the document edge is detected on a white background. Since the background becomes white and the document becomes black when the document cover is in the closed state, the position of the document edge becomes the position in the scan direction where the density change from black to white is equal to or greater than a predetermined threshold value. The position of the document edge acquired on a white background is saved to the RAM 210C.

Next, in step 324, the document size is acquired on the basis of the position of the document edge acquired on a black background and the position of the document edge acquired on a white background, and the routine ends. Note that although this exemplary embodiment describes the example of acquiring both the position of the document edge acquired on a black background and the position of the document edge acquired on a white background, either one of the above may also be acquired. Also, since the position of the document edge acquired on a black background may sometimes differ from the position of the document edge acquired on a white background in the case of acquiring both, an order of priority may be set for both to determine which position to use as a basis for acquiring the document size.

Figure 10:
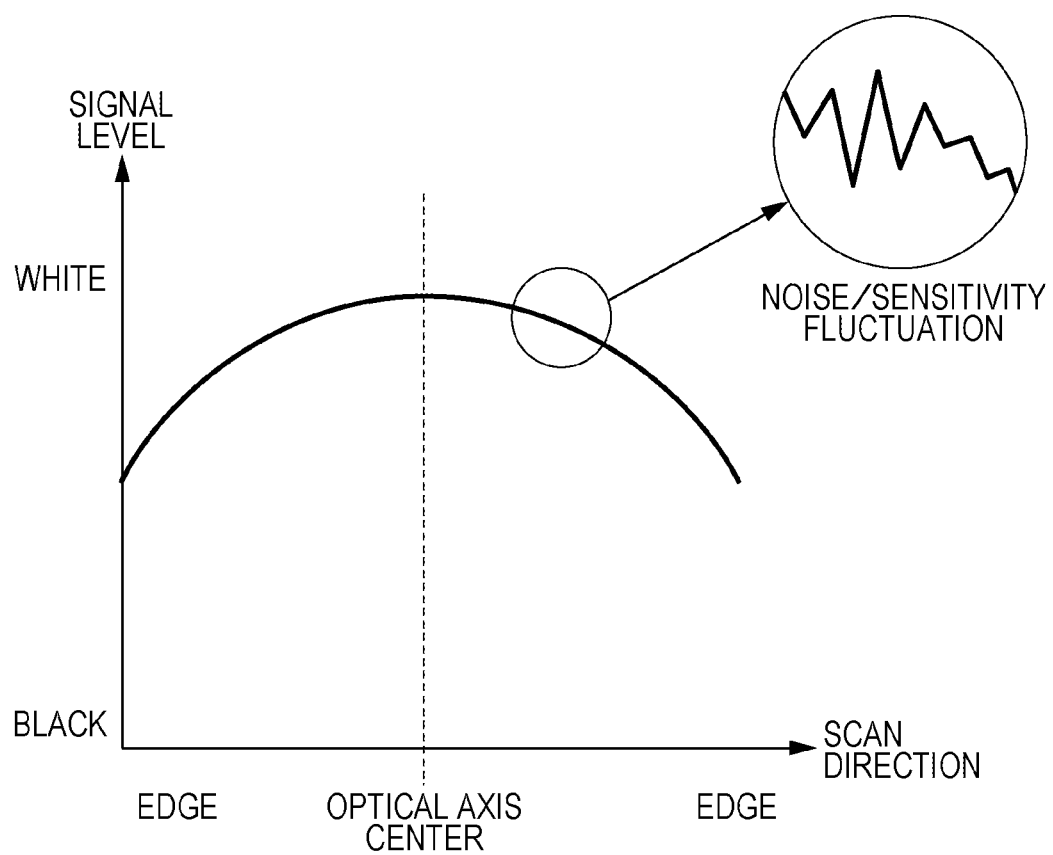
FIG. 10 is a graph illustrating white reference image information.

FIG. 10 is a graph illustrating white reference image information. As illustrated in FIG. 10, one line's worth of white reference image information in the scan direction does not express a constant value, due to factors such as fluctuations in the pixel sensitivity of the photoelectric transducer, fluctuations in the light intensity distribution, and noise. For example, from the perspective of fluctuations in the light intensity distribution, the white level at the edges of the scan width in the scan direction is lower than the white level in the center (optical axis center) of the scan width in the scan direction. With a smoothing process, the one line's worth of image information in the scan direction is smoothed, thereby correcting fluctuations in the pixel sensitivity of the photoelectric transducer and density fluctuations due to noise.

Figure 11A:
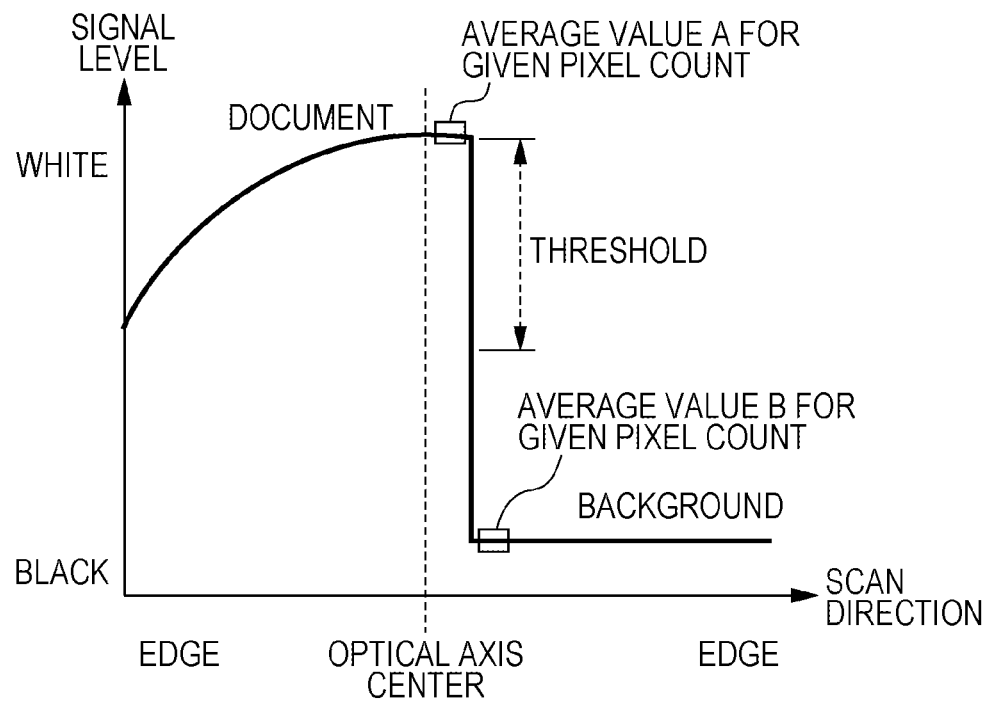
Figure 11B:
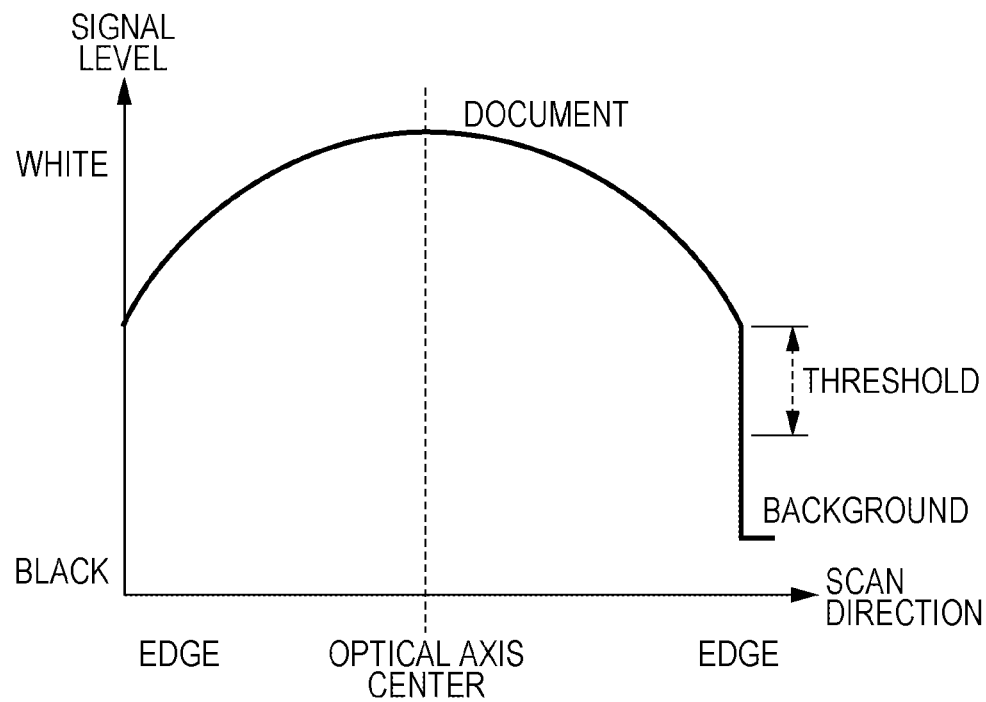
FIG. 11B is a graph illustrating a threshold set with respect to density change at the edge.

In addition, as illustrated in FIGS. 11A and 11B, due to variation in the light intensity distribution of the one line's worth of white reference image information in the scan direction, the density differential between document and background is larger at the optical axis center, and smaller at the edges. Consequently, the threshold value with respect to density change may also change depending on the distance from the optical axis center. In other words, multiple threshold values may be set according to the position in the scan direction (in other words, according to the variation in the light intensity distribution), such as setting a greater threshold value in a region of high white level (the optical axis center) than in a region of low white level (the edge).

For example, threshold values may be varied according to the distance from the optical axis center in a stepwise manner. Alternatively, threshold values may be continuously varied according to the distance from the optical axis center by multiplying a predetermined reference value by a coefficient that depends on the distance from the optical axis center. By varying threshold values according to the distance from the optical axis center (in other words, according to the variation in the light intensity distribution), misdetection at the document edge is reduced, and the document edge detection accuracy improves.

Second Exemplary Embodiment

An image forming apparatus and reading unit according to the second exemplary embodiment have the same configuration as the first exemplary embodiment, with the exception of the sequences of the process for switching to the power-saving state and the process for restoring the standby state. For this reason, description of the apparatus configuration is omitted, and the sequences of the process for switching to the power-saving state and the process for restoring the standby state which are the point of difference will be described.

(Switching to the Power-Saving State)

First, operation for switching to the power-saving state will be described.

FIG. 12 is a flowchart illustrating the sequence of a process for switching to a power-saving state, which is executed according to the second exemplary embodiment of the present invention. The process for switching to the power-saving state is executed by the CPU 210A of the controller 210. The process for switching to the power-saving state is initiated after having entered the standby state.

First, in step 400, it is determined whether or not the controller 200 of the image forming apparatus 10 has issued instructions for switching to the power-saving state. The process proceeds to step 402 in the case where instructions for switching to the power-saving state have been issued. The determination in step 400 is repeated until instructions for switching to the power-saving state are issued. Next, in step 402, the drive circuit 260 is controlled to move the carriage under the white reference plate.

Next, in step 404, the drive circuit 270 is controlled to turn on the light source. Next, in step 406, an image of the white reference plate is read, and a gain adjustment value is acquired and set in the non-volatile memory 210D. Next, in step 408, the drive circuit 270 is controlled to turn off the light source. Next, in step 410, an image of the white reference plate is read, and an offset adjustment value is acquired and set in the non-volatile memory 210D. Next, in step 412, a notification indicating that switching preparations are complete is issued to the controller 200 of the image forming apparatus 10, and the routine ends.

(Restoring the Standby State)

Next, operation for restoring the standby state will be described.

FIG. 13 is a flowchart illustrating the sequence of a process for restoring the standby state, which is executed according to the second exemplary embodiment of the present invention. The process for restoring the standby state is executed by the CPU 210A of the controller 210. The process for restoring the standby state is initiated after having entered the power-saving state.

First, in step 500, it is determined whether or not the controller 200 of the image forming apparatus 10 has issued instructions for restoring the standby state. The process proceeds to step 502 in the case where instructions for restoring the standby state have been issued. The determination in step 500 is repeated until instructions for restoring the standby state are issued. Next, in step 502, it is determined whether or not a detection signal has been acquired from the cover state detector 304 which detects the opening and closing of the document cover.

The process proceeds to step 504 in the case where a detection signal from the cover state detector 304 is acquired. The process proceeds to step S14 in the case where a detection signal from the cover state detector 304 has not been acquired. Since the carriage is moved under the white reference plate when switching to the power-saving state, in step S504 the drive circuit 260 is controlled to move the carriage to the document reading position. Next, in step 506, the previously stored gain adjustment value is set in the AGC circuit 222, and in the following step 508, the previously stored offset adjustment value is set in the AOC circuit 224.

Next, in step S10, a document size detection process that detects the size of the document is executed. Since the document size detection process herein has the same sequence as in the first exemplary embodiment, description thereof will be omitted. Once the document size detection process ends, the process proceeds to the following step S12. Since the sequence from step S12 to step S30 is also the same as the sequence from step 210 to step 228 in FIG. 8, description thereof will be omitted. In the second exemplary embodiment, in step S30, a notification indicating that restoring preparations are complete is issued to the controller 200 of the image forming apparatus 10, and the routine ends.

Third Exemplary Embodiment

An image forming apparatus and reading unit according to the third exemplary embodiment have the same configuration as the first exemplary embodiment, with the exception of the sequences of the process for switching to the power-saving state and the process for restoring the standby state. For this reason, description of the apparatus configuration is omitted, and the sequences of the process for switching to the power-saving state and the process for restoring the standby state which are the point of difference will be described.

(Switching to the Power-Saving State)

First, operation for switching to the power-saving state will be described.

Figure 14:
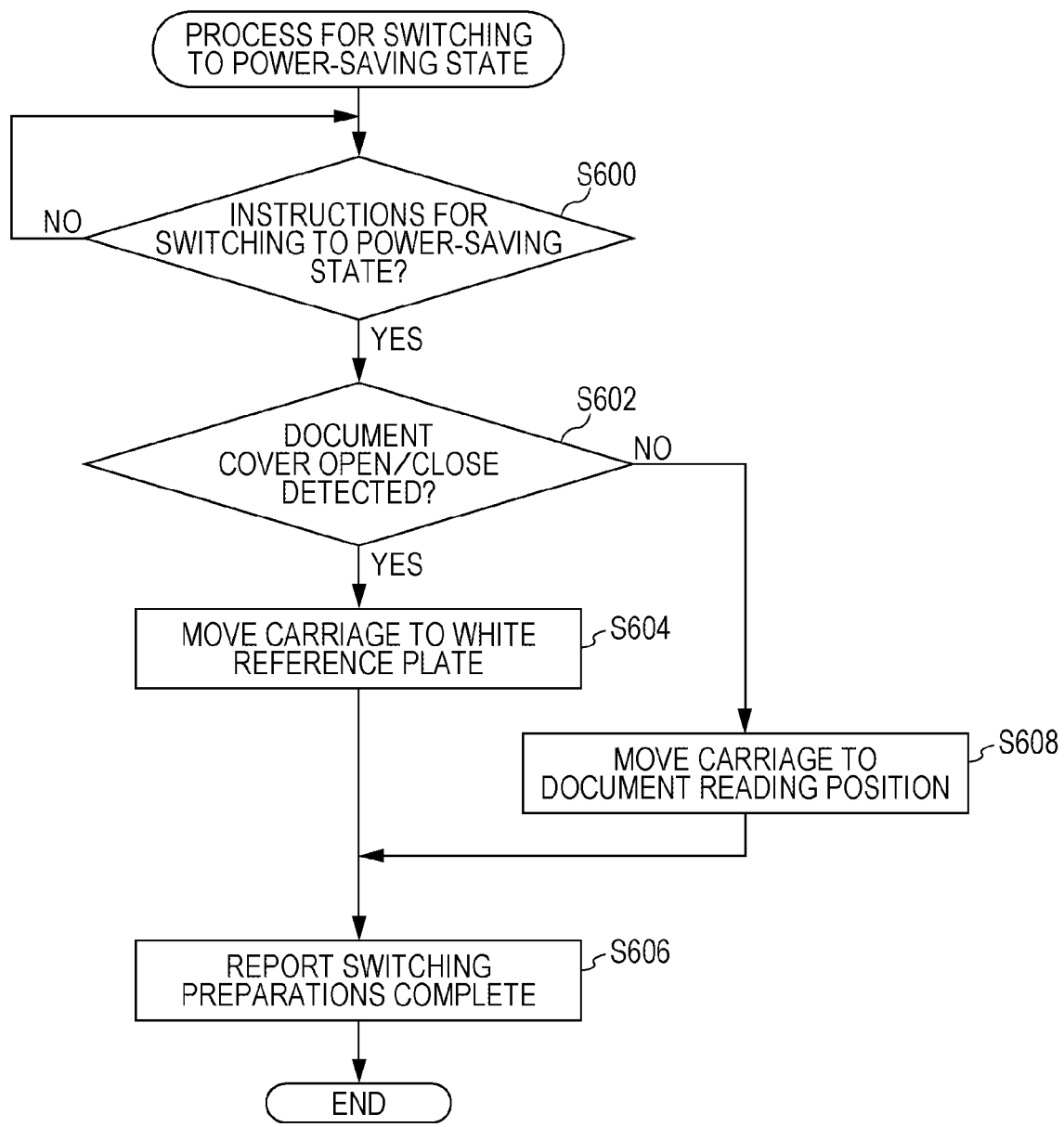
FIG. 14 is a flowchart illustrating the sequence of a process for switching to a power-saving state, which is executed according to a third exemplary embodiment of the present invention.

FIG. 14 is a flowchart illustrating the sequence of a process for switching to a power-saving state, which is executed according to the third exemplary embodiment of the present invention. The process for switching to the power-saving state is executed by the CPU 210A of the controller 210. The process for switching to the power-saving state is initiated after having entered the standby state.

First, in step 600, it is determined whether or not the controller 200 of the image forming apparatus 10 has issued instructions for switching to the power-saving state. The process proceeds to step 602 in the case where instructions for switching to the power-saving state have been issued. The determination in step 600 is repeated until instructions for switching to the power-saving state are issued. Next, in step 602, it is determined whether or not the document cover is in the closed state, on the basis of a detection signal from the cover state detector 304.

In the case where the document cover is in a closed state, the process proceeds to step 604, and the drive circuit 260 is controlled to move the carriage under the white reference plate. In the case of switching to the power-saving state with the document cover in the closed state, subsequently the document cover will be opened, a document will be placed, and the document cover will be closed. Since the image forming apparatus switches to the standby state upon detecting that the document cover has been opened, there is still time to move the carriage to the document reading position $P_H$ and detect the document size during restoration, even if the carriage is moved under the white reference plate. Next, in step 606, a notification indicating that switching preparations are complete is issued to the controller 200 of the image forming apparatus 10, and the routine ends.

On the other hand, in the case where the document cover is not in the closed state, or in other words the case where the document cover is in the open state, the process proceeds to step 608, and the drive circuit 260 is controlled to move the carriage to the document reading position $P_H$. In the case of switching to the power-saving state with the document cover in the open state, subsequently a document will be placed, and the document cover will be closed. Since the image forming apparatus switches to the standby state upon detecting that the document cover has been closed, moving the carriage under the white reference plate entails the risk that there may not be enough time ensured to move the carriage to the document reading position $P_H$ and detect the document size during restoration. Consequently, the carriage is moved to the document reading position $P_H$ to enable document size detection to be reliably conducted. Next, in step 606, a notification indicating that switching preparations are complete is issued to the controller 200 of the image forming apparatus 10, and the routine ends.

(Restoring the Standby State)

Next, operation for restoring the standby state will be described.

Figure 15:
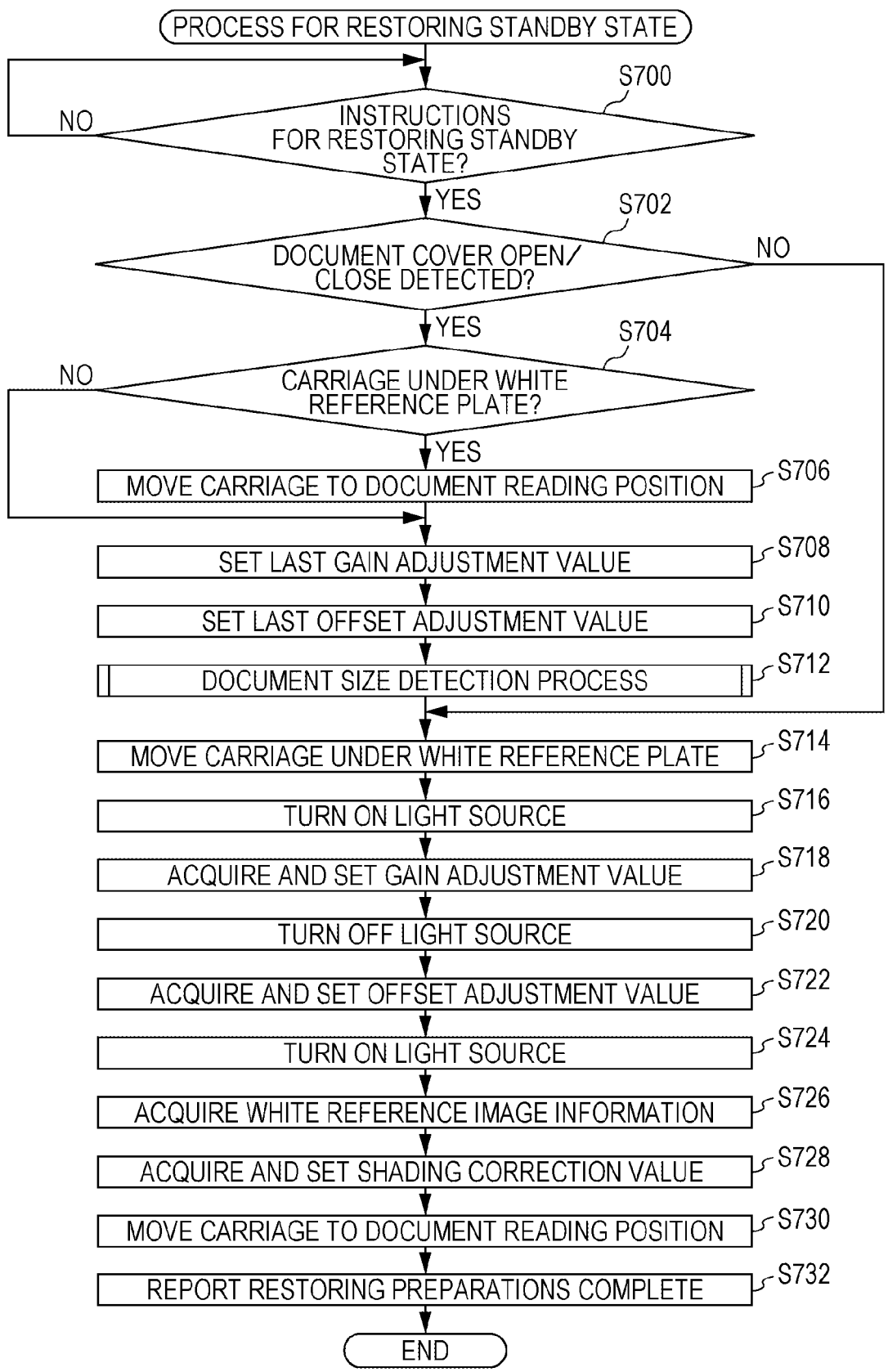
FIG. 15 is a flowchart illustrating the sequence of a process for restoring the standby state, which is executed according to a third exemplary embodiment of the present invention.

FIG. 15 is a flowchart illustrating the sequence of a process for restoring the standby state, which is executed according to the third exemplary embodiment of the present invention. The process for restoring the standby state is executed by the CPU 210A of the controller 210. The process for restoring the standby state is initiated after having entered the power-saving state.

First, in step 700, it is determined whether or not the controller 200 of the image forming apparatus 10 has issued instructions for restoring the standby state. The process proceeds to step 702 in the case where instructions for restoring the standby state have been issued. The determination in step 700 is repeated until instructions for restoring the standby state are issued. Next, in step 702, it is determined whether or not a detection signal has been acquired from the cover state detector 304 which detects the opening and closing of the document cover.

The process proceeds to step 704 in the case where a detection signal from the cover state detector 304 is acquired. The process proceeds to step 714 in the case where a detection signal from the cover state detector 304 has not been acquired. Next, in step 704, it is determined whether or not the carriage is under the white reference plate. In the case where the carriage is under the white reference plate, the process proceeds to step 706, and the drive circuit 260 is controlled to move the carriage to the document reading position. In contrast, the process proceeds to step 708 in the case where the carriage is not under the white reference plate, or in other words, is at the document reading position.

Next, in step 708, the last gain adjustment value is set in the AGC circuit 222, and in the following step 710, the last offset adjustment value is set in the AOC circuit 224. Next, in step 712, a document size detection process that detects the size of the document is executed. Since the document size detection process herein has the same sequence as in the first exemplary embodiment, description thereof will be omitted. Once the document size detection process ends, the process proceeds to the following step 714. Since the sequence from step 714 to step 732 is also the same as the sequence from step 210 to step 228 in FIG. 8, description thereof will be omitted. In the third exemplary embodiment, in step 732, a notification indicating that restoring preparations are complete is issued to the controller 300 of the image forming apparatus 10, and the routine ends.

Note that the configurations of an image reading apparatus and method, an image forming apparatus, and a computer-readable medium described in the foregoing exemplary embodiments are examples, and that obviously these configurations may also be modified within a scope that does not depart from the principal matter of the present invention.

For example, although the foregoing exemplary embodiments describe an example of a configuration in which an offset adjustment value is set in an AOC circuit, it may also be configured such that an analog processor circuit uses the mask pixels of a photoelectric transducer to automatically adjust the black level, or such that an analog processor circuit is made to automatically adjust the black level without using the last offset adjustment value.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
a document cover;
a cover state detector configured to detect whether the document cover is open or closed;
an image reading unit configured to read an image of a target object by conducting an optical scan that moves a scanning body with a mounted light source, detecting reflected light from the target object with a photoelectric transducer, and outputting a signal expressing the detected pixel densities;
a white reference plate configured as a reference for correcting an image;
a power manager configured to switch between a power-saving state and a standby state in which more power is supplied to the image reading apparatus than in the power-saving state; and
a controller configured to control the image reading apparatus to restore the standby state,
wherein the controller is configured to, in response to the standby state being restored in response to detecting opening or closing of the document cover, control the image reading apparatus to read an image of a document to detect a document size, and after the detection of document size, read an image of the white reference plate to acquire correction values,
wherein the controller is configured to control the image reading apparatus such that, in response to switching to the power-saving state while the document cover is in an open state, the scanning body is moved to a document reading position before switching to the power-saving state, and
wherein the controller is also configured to control the image reading apparatus such that, in response to switching to the power-saving state while the document cover is in a closed state, the scanning body is moved to and stopped at a position directly under the white reference plate before switching to the power-saving state.

2. The image reading apparatus according to claim 1, wherein the controller is configured to, in response to the standby state being restored in response to a factor other than detecting the opening or closing of the document cover, control the image reading apparatus to read an image of the white reference plate to acquire correction values.

3. The image reading apparatus according to claim 1, wherein the controller is configured to, in response to a trigger for the standby state being restored, the trigger being detecting opening or closing of the document cover by the cover state detector, set a preset gain adjustment value and control the image reading apparatus to read the image of the document to detect the document size using the preset gain adjustment value.

4. The image reading apparatus according to claim 1, wherein the controller is configured to detect the document size after applying a smoothing process to the read image of the document.

5. The image reading apparatus according to claim 1, wherein the controller is configured to read an image of the document in a first direction intersecting a movement direction of the scanning body, compute a density change in the first direction, detect a position where a magnitude of density change becomes equal to or greater than a threshold value as a document edge position, and detect the document size using the document edge position.

6. The image reading apparatus according to claim 5, wherein a plurality of threshold values are set using the density change in response to reading an image of the white reference plate in the first direction, such that a threshold value for a region of high white level is greater than a threshold value for a region of low white level.

7. The image reading apparatus according to claim 1, wherein the controller is configured to control the image reading apparatus so as to move the scanning body under the white reference plate and switch to the power-saving state after the moving.

8. An image forming apparatus comprising:
the imaging reading apparatus according to claim 1.

9. The image reading apparatus according to claim 1, wherein the controller is configured to, while the image reading apparatus is in the standby state, control the image reading apparatus to, in response to detecting opening or closing of the document cover, read an image of a document to detect document size, and after the detection of document size, read an image of the white reference plate to acquire correction values.

10. The image reading apparatus according to claim 1, wherein the controller is configured to control the image reading apparatus such that, in response to switching to the power-saving state while the document cover is in the closed state, the scanning body is moved to and stopped at the position under the white reference plate before switching to the power-saving state, and the scanning body remains stopped at the position while switching to the power-saving state.

11. The image reading apparatus according to claim 1, wherein the controller is configured to, in response to the standby state being restored in response to detecting opening of the document cover, control the image reading apparatus to read an image of a document to detect a document size, and after the detection of document size, read an image of the white reference plate to acquire correction values.

12. A method for controlling an image reading apparatus, the method comprising:
   receiving restoration instructions for restoring a standby state from a power-saving state,
      wherein more power is supplied to the image reading apparatus in the standby state than in the power-saving state;
   in response to receiving the restoration instructions in response to detecting opening or closing of a document cover, detecting a document size by reading an image of a document;
   after the detecting the document size, acquiring correction values by reading an image of a white reference plate;
   in response to switching to the power-saving state while the document cover is in an open state, moving a scanning body to a document reading position before switching to the power-saving state; and
   in response to switching to the power-saving state while the document cover is in a closed state, moving the scanning body to and stopping the scanning body at a position directly under the white reference plate before switching to the power-saving state.

13. A non-transitory computer readable medium storing a program causing a computer to execute a process for controlling an image reading apparatus, the process comprising:
   receiving restoration instructions for restoring a standby state from a power-saving state,
      wherein more power is supplied to the image reading apparatus in the standby state than in the power-saving state;
   in response to receiving the restoration instructions in response to detecting opening or closing of a document cover, detecting a document size by reading an image of a document;
   after the detecting the document size, acquiring correction values by reading an image of a white reference plate;
   in response to switching to the power-saving state while the document cover is in an open state, moving a scanning body to a document reading position before switching to the power-saving state; and
   in response to switching to the power-saving state while the document cover is in a closed state, moving the scanning body to and stopping the scanning body at a position directly under the white reference plate before switching to the power-saving state.

* * * * *